US011858116B2

(12) United States Patent
Winnard et al.

(10) Patent No.: US 11,858,116 B2
(45) Date of Patent: *Jan. 2, 2024

(54) FRICTION POST SOCKET TOOL HOLDER

(71) Applicant: Mechanic's Time Savers, Inc., Dallas, TX (US)

(72) Inventors: Shawn D. Winnard, Dallas, TX (US); Richard A. Heidelberger, Dallas, TX (US)

(73) Assignee: Mechanic's Time Savers, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,409

(22) Filed: Oct. 10, 2022

(65) Prior Publication Data

US 2023/0057776 A1 Feb. 23, 2023

Related U.S. Application Data

(63) Continuation of application No. 17/357,899, filed on Jun. 24, 2021, now Pat. No. 11,491,638, which is a continuation of application No. 16/888,702, filed on May 30, 2020, now Pat. No. 11,059,164, which is a continuation of application No. 16/278,158, filed on Feb. 17, 2019, now Pat. No. 10,675,750.

(51) Int. Cl.

*B25H 3/06* (2006.01)
*G09F 3/02* (2006.01)
*B25H 3/00* (2006.01)

(52) U.S. Cl.

CPC ............... *B25H 3/06* (2013.01); *B25H 3/003* (2013.01); *G09F 3/02* (2013.01); *G09F 2003/0214* (2013.01)

(58) Field of Classification Search

CPC .. B25H 3/06; B25H 3/003; B25H 3/04; G09F 3/02; G09F 2003/0214; A47F 7/0028; B24B 13/56

USPC ........ 211/70.6, 69, 69.1; 206/372, 373, 378, 206/379

See application file for complete search history.

(56) References Cited

U.S. PATENT DOCUMENTS 1,712,473 A * 5/1929 McWethy .............. B25H 3/003 206/378
3,405,377 A * 10/1968 Pierce .................... B25H 3/003 206/378
3,726,393 A * 4/1973 Thompson ............ A47F 7/0028 206/378
4,621,738 A * 11/1986 DeLucchi .............. B25H 3/003 294/158
5,467,874 A * 11/1995 Whitaker ................. B25H 3/06 248/309.2
5,535,882 A * 7/1996 Liu ........................ B25H 3/003 224/679
5,645,177 A * 7/1997 Lin .......................... B25H 3/04 211/69.5
5,660,276 A * 8/1997 Winnard ................ B25H 3/028 211/DIG. 1
5,669,516 A * 9/1997 Horn ........................ B25H 3/06 211/DIG. 1

(Continued)

*Primary Examiner* — Jennifer E. Novosad

(74) *Attorney, Agent, or Firm* — Peter V. Schroeder; Booth Albanesi Schroeder PLLC

(57) ABSTRACT

A socket organizer for releasably holding socket holders has a plurality of friction fit posts onto which sockets are positioned and held securely.

6 Claims, 11 Drawing Sheets

(56) References Cited

U.S. PATENT DOCUMENTS 5,711,435 A * 1/1998 Morison .................. A47F 5/08 248/223.41
5,855,285 A * 1/1999 Laird .................... B25H 3/003 206/378
6,006,906 A * 12/1999 Winnard .................. B25H 3/06 206/376
6,070,745 A * 6/2000 Dembicks ................ B25H 3/06 211/89.01
6,092,655 A * 7/2000 Ernst ..................... B25H 3/06 206/378
6,168,018 B1 * 1/2001 Ramsey .................. B25H 3/06 206/378
6,386,363 B1 * 5/2002 Huang .................. B25H 3/003 206/378
6,431,373 B1 * 8/2002 Blick ..................... B25H 3/003 206/378
6,488,151 B2 * 12/2002 Ramsey .................. B25H 3/06 206/378
6,494,329 B1 * 12/2002 Dembicks .............. B25H 3/003 206/378
6,571,966 B1 * 6/2003 Hsiao .................... A47F 7/0028 206/379
6,637,605 B2 * 10/2003 Ernst ..................... B25H 3/003 206/378
6,854,607 B2 * 2/2005 Tong ...................... B25H 3/003 206/378
6,991,105 B2 * 1/2006 Winnard ................ B25H 3/003 206/378
7,108,132 B2 * 9/2006 Shih ....................... B25H 3/003 206/459.1
7,152,747 B2 * 12/2006 Wang .................... A47F 5/0006 211/70.6
7,264,213 B2 * 9/2007 Liu ..................... B65D 73/0064 248/314
7,419,320 B2 * 9/2008 LaBrasca ............... A45C 11/34 206/214
7,658,284 B2 * 2/2010 Lin ........................ B25H 3/003 221/70
7,980,400 B2 * 7/2011 Kao ...................... A47F 5/0807 211/70.6
8,096,516 B2 * 1/2012 Shiao ...................... B25H 3/04 211/70.6
8,336,709 B1 * 12/2012 Geibel ..................... B25H 3/06 206/378
8,479,594 B2 * 7/2013 Hsieh .................... G01L 25/003 73/862.21
8,733,561 B2 * 5/2014 Kao ......................... B25H 3/04 211/94.01
8,770,418 B2 * 7/2014 Ernst ........................ B25H 3/04 269/291
8,955,698 B2 * 2/2015 Hsieh ..................... B25H 3/003 206/378
9,051,103 B2 * 6/2015 Chiang .............. B65D 73/0064
9,180,590 B1 * 11/2015 Ou ......................... B65D 71/00
9,205,552 B2 * 12/2015 Kao ..................... F16M 13/022
9,205,553 B2 * 12/2015 Ou ........................... B25H 3/04
9,247,832 B2 * 2/2016 Chang ................... A47F 5/0823
9,527,206 B1 * 12/2016 Hsieh ....................... B25H 3/04
9,545,716 B2 * 1/2017 Hsieh ....................... B25H 3/04
9,630,312 B2 * 4/2017 Grela ..................... A47B 96/00
9,757,853 B2 * 9/2017 Su ............................ B25H 3/04
9,873,195 B1 * 1/2018 Buxton .................. B25H 3/003
9,878,441 B1 * 1/2018 Kao ....................... B25H 3/003
9,914,207 B2 * 3/2018 Kao ......................... B25H 3/04
10,130,194 B1 * 11/2018 Lai ........................... B25H 3/04
10,421,175 B2 * 9/2019 Chou ....................... B25H 3/04
10,675,750 B1 * 6/2020 Winnard ................ B25H 3/003
11,059,164 B2 * 7/2021 Winnard ................... G09F 3/02
11,091,778 B2 * 8/2021 Winnard ................ A61K 39/12
11,135,713 B2 * 10/2021 Kao ....................... B65D 73/00
11,253,988 B1 * 2/2022 Hsieh ....................... B25H 3/04
11,358,271 B2 * 6/2022 Chang .................... B25H 3/003
11,491,638 B2 * 11/2022 Winnard ................... G09F 3/02
2005/0103664 A1 * 5/2005 Shih ........................ B25B 13/56 206/378
2005/0221664 A1 * 10/2005 Winnard ................ B25H 3/003 439/510
2009/0145865 A1 * 6/2009 Yu .......................... B25H 3/003 700/95
2011/0089126 A1 * 4/2011 Hsieh ....................... B25H 3/06 211/70.6
2011/0233160 A1 * 9/2011 Chen ........................ B25H 3/06 211/70.6
2013/0186243 A1 * 7/2013 Harper ................ B25B 23/0035 29/446
2016/0107308 A1 * 4/2016 Hsu ........................ B25H 3/003 206/349
2017/0361453 A1 * 12/2017 Kao ....................... B25H 3/003
2018/0065792 A1 * 3/2018 Chen ...................... B25H 3/003
2022/0132719 A1 * 5/2022 Honey ..................... A01B 1/00 172/663

* cited by examiner

FRICTION POST SOCKET TOOL HOLDER

CROSS-REFERENCE TO RELATED APPLICATIONS

This is a Continuation application claiming priority to U.S. patent application Ser. No. 17/357,899, filed Jun. 24, 2021, and U.S. patent application Ser. No. 16/888,702, filed May 30, 2020, now issued as U.S. Pat. No. 11,059,164, and U.S. patent application Ser. No. 16/278,158, filed Feb. 17, 2019, now issued as U.S. Pat. No. 10,675,750.

TECHNICAL FIELD

The disclosure relates to releasable hand tool holders and more particularly to an apparatus for securely and releasably holding sockets which can be readily positioned on and removed from the tool holder.

BRIEF DESCRIPTION OF THE DRAWINGS

For a more complete understanding of the present invention, and the advantages thereof, reference is now made to the following description which is to be taken in conjunction with the accompanying drawings in which like reference numerals indicate like parts and wherein.

DETAILED DESCRIPTION OF THE DISCLOSURE

Socket tools, or simply sockets, are universally used by professional and amateur mechanics and maintenance technicians and come in sets of various size and style. Storing and organizing sockets is a challenge due to their various sizes, shape, and typical numbers in a set.

Commercially available socket holder apparatus typically provide a series of individual socket holders in a straight line configuration along a central rail or tool body. The sockets are attached and released by hand, such as by push-on, pull-off action or by half-turns and the like, from a holding post or similar. The sockets held on the socket holders are in close proximity to one another and adjacent sockets can "rattle" or impact one another, especially during transport of the apparatus in a vehicle. Repeated contact eventually results in damage to adjacent sockets such as flaking chrome or coating, scratches and dents and the like.

Some socket holders are mounted to move along a rail or tool body without any way to secure the socket holders to specific locations. For larger socket sizes, adjacent sockets bang into one another every time the rail or body is tilted sufficiently to cause the holders to slide and when the rail is rotated to or through a generally vertical orientation. Even on an apparatus having a way to secure the socket holders into selected positions, the holders sometimes come loose by accident, vibration, part failure, or wear, resulting in unwanted and damaging rattling or sliding of adjacent sockets into one another. Secure and spaced positioning of adjacent socket holders on a tool holding apparatus to prevent contact between adjacent sockets is needed.

While the sockets are typically marked with identifying information, often by stamping of the exterior surface of the socket cylinder, it can be difficult to read the information, especially where the sockets are positioned in a line where the information can be obscured by adjacent sockets.

Friction Socket Holder Assembly

Figure 1:
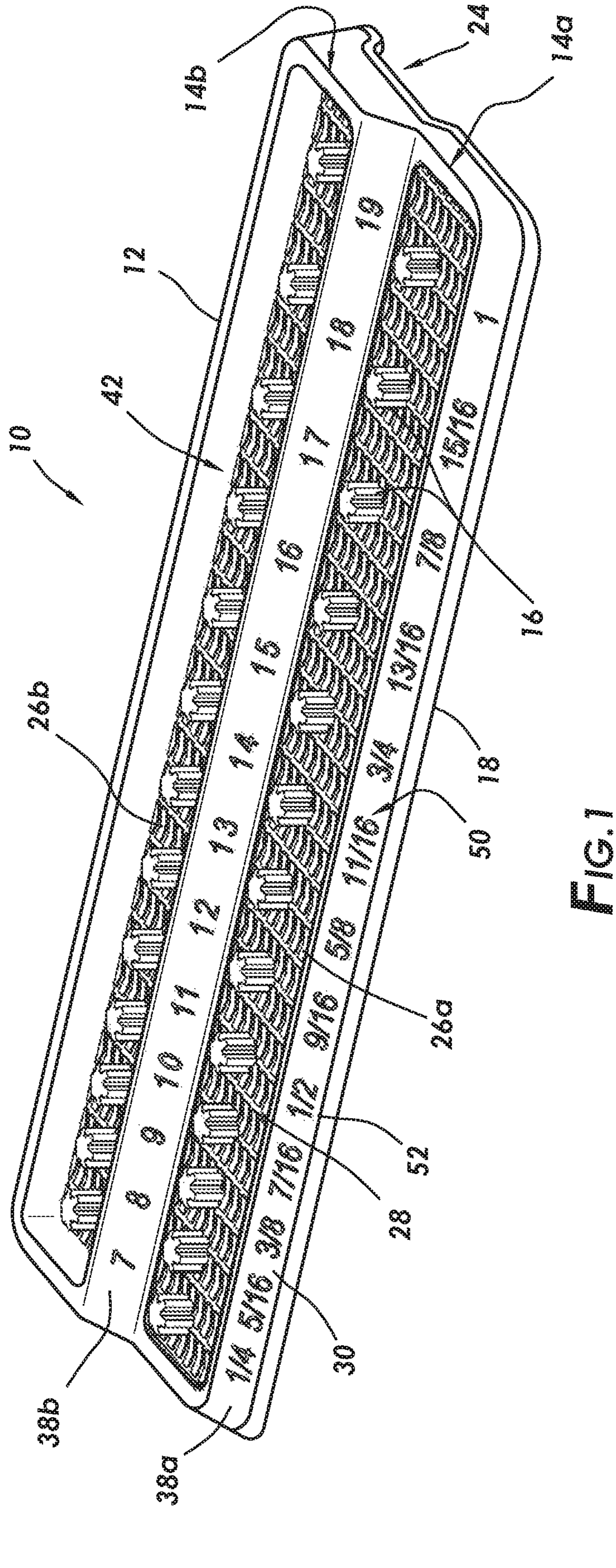
FIG. 1 is an orthogonal view of an exemplary friction socket holder according to aspects of the disclosure.
Figure 2:
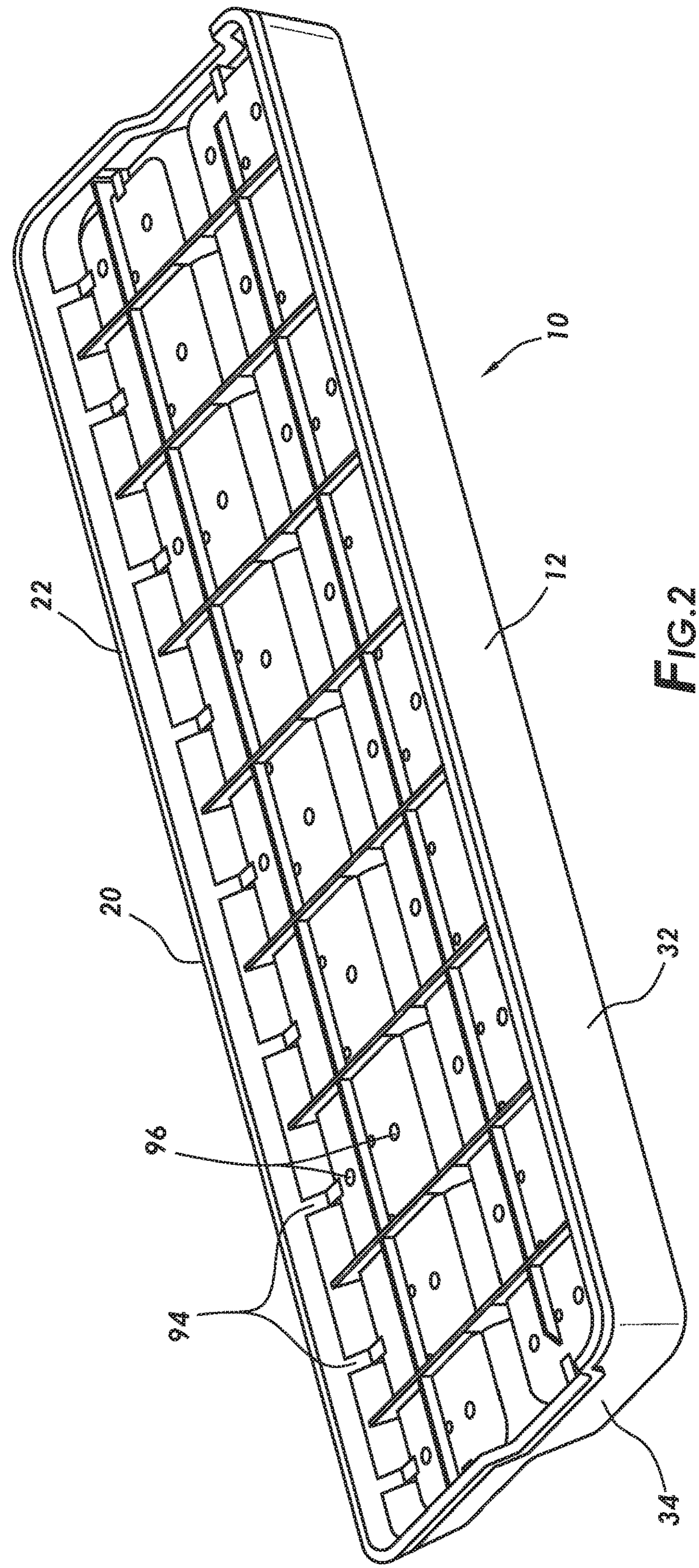
FIG. 2 is an orthogonal view of the bottom of the exemplary friction socket holder of FIG. 1 according to aspects of the disclosure.
Figure 3:
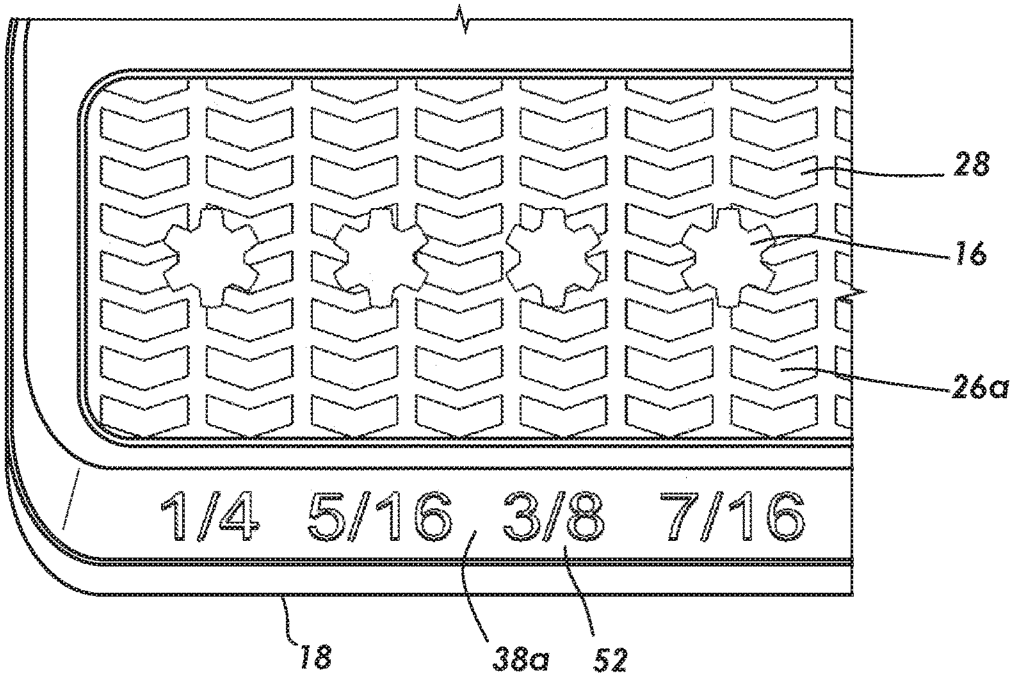
FIG. 3 is a detail top view of a friction post of the exemplary friction socket holder of FIG. 1 according to aspects of the disclosure.

FIG. 1 is an orthogonal view of an exemplary friction socket holder according to aspects of the disclosure. FIG. 2 is an orthogonal view of the bottom of the exemplary friction socket holder of FIG. 1 according to aspects of the disclosure. FIG. 3 is a detail view of a friction post of the exemplary friction socket holder of FIG. 1 according to aspects of the disclosure. The Figures will be discussed jointly.

FIG. 1 shows a friction post tool holder 10, more specifically a friction post socket tool holder. The holder 10 includes a body 12 having one or more rows 14 of a plurality of spaced-apart friction posts 16 for holding a plurality of tools or sockets.

Socket Holder Assembly

The body 12 has a base 18 designed to sit on a relatively flat surface. The base 18 defines a bottom surface 20 of the body 12. In an embodiment, the bottom surface 20 of the body 12 is defined by a generally flat perimeter 22 as shown. In alternate embodiments, the bottom surface 20 can define a generally flat planar wall, a contoured surface, a plurality of feet, etc. In an embodiment, as shown, the bottom surface 20 is made of a non-slip material such as rubber, silicone or the like, including Thermal Plastic Rubber (TPR), Thermal Plastic Elastomer (TPE), or silicone rubber. The non-slip material assists in maintaining the tool holder in a selected position on a surface, particularly a surface which is at an angle to the horizontal, such as on a typical hood, trunk, roof, or other vehicle part, or on a vibrating or moving surface, such as on an idling vehicle or a table supporting an operating power tool or motor or the like. The non-slip bottom surface 20 can be integrally formed with the body 12, attached to the body 12 by fasteners, adhesives or friction fitting, removably attached to the body 12, etc. In an embodiment, the bottom surface 20 is attached to the body 12 by a manufacturing process referred to as overmolding.

The base 18 can also include finger holds 24 allowing for ease of lifting the tool holder 10 from a surface. The tool holder 10 loaded with sockets has substantial weight and can be difficult to lift or to "pry" from a flat surface. The finger holds 24 provide a surface for the user to grasp or lift. Alternately the finger holds 24 can be apertures in the body 12, contours shaped into the body 12, or grips of non-slip material attached to the body 12.

The body 12 defines at least one platform 26 for positioning of the held sockets. The platform 26 is elongate to define a row 14 of posts 16 and a row of sockets when in use. A platform 26*a* can define an elevated surface, that is, generally flush with the height of the wall 30, as seen in row 14*a* in FIG. 1. Alternately, a platform 26*b* can define a "sunken" or recessed surface, as seen in row 14*b* of FIG. 1. Mounted to the platform 26 can be a platform sheet 28, such as a non-slip, embossed, or decorated sheet covering or substantially covering the platform 26. Preferably such a sheet is of a soft material so as to not scratch or damage the sockets. The sheet 28 can be attached to the platform 26 fixedly, removably, by adhesive or other fastener. In an embodiment, the platform sheet 28 is attached to the base 12 by overmolding. In an embodiment, the sheet 28 is integral with the posts 16.

The body 12 can take various shape depending on the types and sizes of tools to be held, the arrangement of held tools, the aesthetics of the holder, etc. The base 12 as shown includes an opposed front wall 30 and back wall 32, and opposed side walls 34. The walls in some embodiments are connected to one another. In some embodiments the walls are generally vertical. In some embodiments, as shown, some or all of the walls can be angled with respect to the vertical.

The body 12 can also include sloped surfaces 38*a* and 38*b* defined, for example, between the generally horizontally planar surfaces or platforms 26*a* and 26*b*. The sloped surface 38*a*, for example, can form the front wall 30 or a portion thereof. In other embodiments, a generally vertical front wall 30 and a sloped surface, such as surface 38*a*, may both be present. The planar surfaces 26*a* and 26*b* can be at different heights to allow for ease of socket placement and removal, positioning of sockets of different sizes at different levels, separation of sockets of different sizes, types, drive socket shapes, socket heads, or measurement standards (SAE, metric), etc. As seen in FIG. 1, the planar surface 26*b* is positioned in a recessed area 42. A recessed area may provide additional protection to the sockets from scratches and damage during handling and use of the holder.

The holder body 12 can be made of various materials. In embodiments, the holder body 12 is made of plastic, such as ABS, nylon, polycarbonate, polypropylene, etc., and can be manufactured using a mold. Such materials and manufacture allow for a wide variety of body shapes and sizes at a reasonable expense.

The tool holder 10 can also include a labelling assembly 50. The labelling assembly 50 includes markings 52 to convey information about the tools, such as markings indicating socket sizes in SAE or metric sizes. The labels can comprise embossing, etching, silk-screening, engraving or other markings directly onto the body 12, such as seen in FIG. 1. The labels can be positioned at sloped surfaces 38, as shown, for ease of viewing from the front or above the holder. The labels can comprise adhesive labels positioned on the body.

Figure 4B:
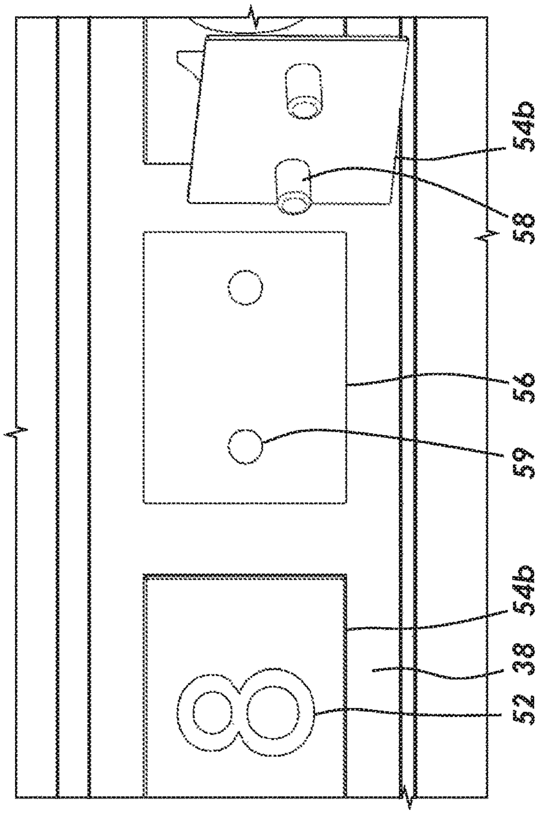
FIGS. 4A-C are detail views of embodiments of socket labels for permanent or removable attachment to the exemplary friction socket holder of FIG. 1 according to aspects of the disclosure.
Figure 4A:
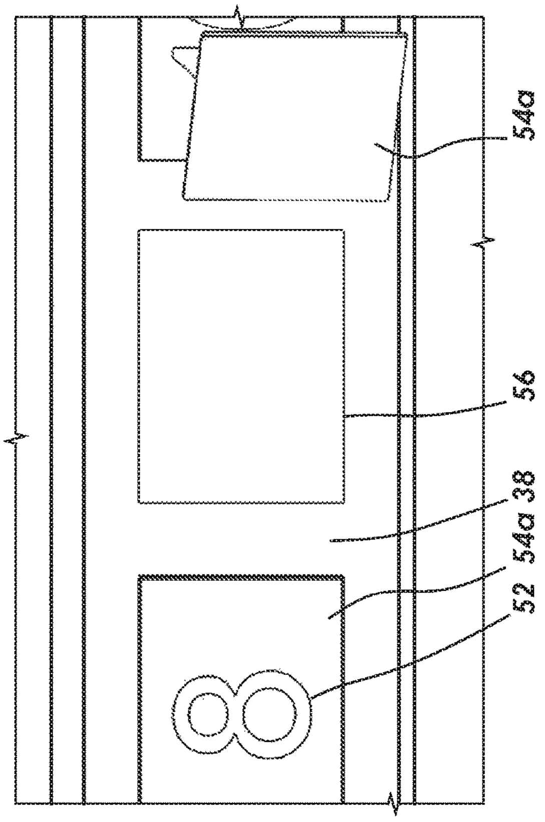
Figure 4C:
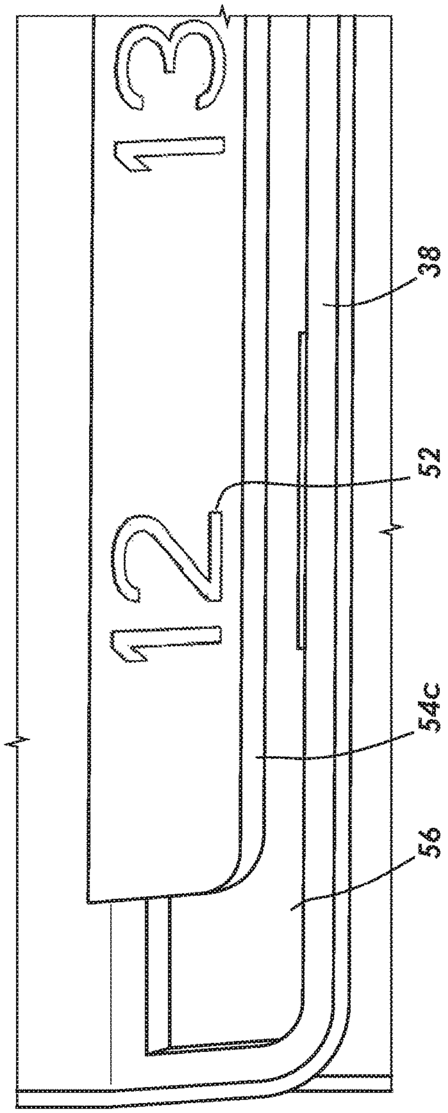

FIGS. 4A-C are detail views of embodiments of tool labels for permanent or removable attachment to the exemplary friction socket holder of FIG. 1 according to aspects of the disclosure. In some embodiments, the labelling assembly 50 includes one or more labels 54 attached or attachable to the body 12. The labels 54 can comprise tabs, strips, ribbons, snap-in labels, etc. The labels can be interchangeably attachable to the body 12, posts 16, platforms 26, sloped surfaces 38, etc., of the holder 10.

FIG. 4A shows an embodiment having a plurality of individual labels 54*a* attachable to corresponding individual label panels 56 defined on the sloped surface 38 of the holder 10. The individual labels 54*a* can be attached removably or permanently. Each individual label corresponds to an individual post 16 of the holder assembly 10. That is, the individual label 54*a* is of a length corresponding to the area associated with a post 16 and positioned to indicate that the label corresponds to the post. The labels can be attached, for example, by adhesive, friction fit, snap-in, etc.

FIG. 4B shows an embodiment having a plurality of individual labels 54*b* attachable or removably attachable to the sloped surface 38 of the holder 10. In the embodiment shown, each individual label 54*b* has one or more snap-in legs 58 which cooperate with corresponding holes 59 defined in the surface 38. More generally, the labels 54 can define attachment mechanisms 58 which cooperate with corresponding attachment mechanisms 59 defined on the body 12. Other attachment mechanisms are known in the art.

FIG. 4C shows an embodiment having a longitudinally extending label 54*c* having a plurality of markings corresponding to a plurality of posts 16. The strip label 54*c* can be attached, removably or permanently, to the holder 10 such as by adhesive, snap-in assembly, slide-in assembly, tongue and groove, or other mechanisms known in the art. A strip label 54*c*, in strip or ribbon form, may extend the entire length of the platform 26 or sloped surface 38. The strip label 54*c* includes a plurality of markings 52 corresponding to a plurality of posts 16. Interchangeable strip labels 54*c* can be provided such that the user can select from the strip labels 54*c* according to the sizes or types of sockets used with the holder assembly 10. For example, multiple strip labels 54*c* can provide label markings 52 for SAE or metric sizes.

The labels 54 can attach to the body 12 by attachment means as known in the art. For example, the labels 54 can be attached, removably or permanently, by cooperating posts 58 and holes 59, slidable labels and rails 60, tongue and groove, snap-on assembly, etc. The labels 54 can attach to the body such that they are slidable along the length of the body, for example. The user can be provided with a plurality of interchangeable labels 54, fixedly or removably attachable to the body 12 at the user's selection. For example, a kit can be provided having a plurality of labels for SAE and metric measurements, socket type, drive socket type, socket head type, etc. The labels can be color-coded or otherwise visually differentiated.

Clip Labels

Figure 5A:
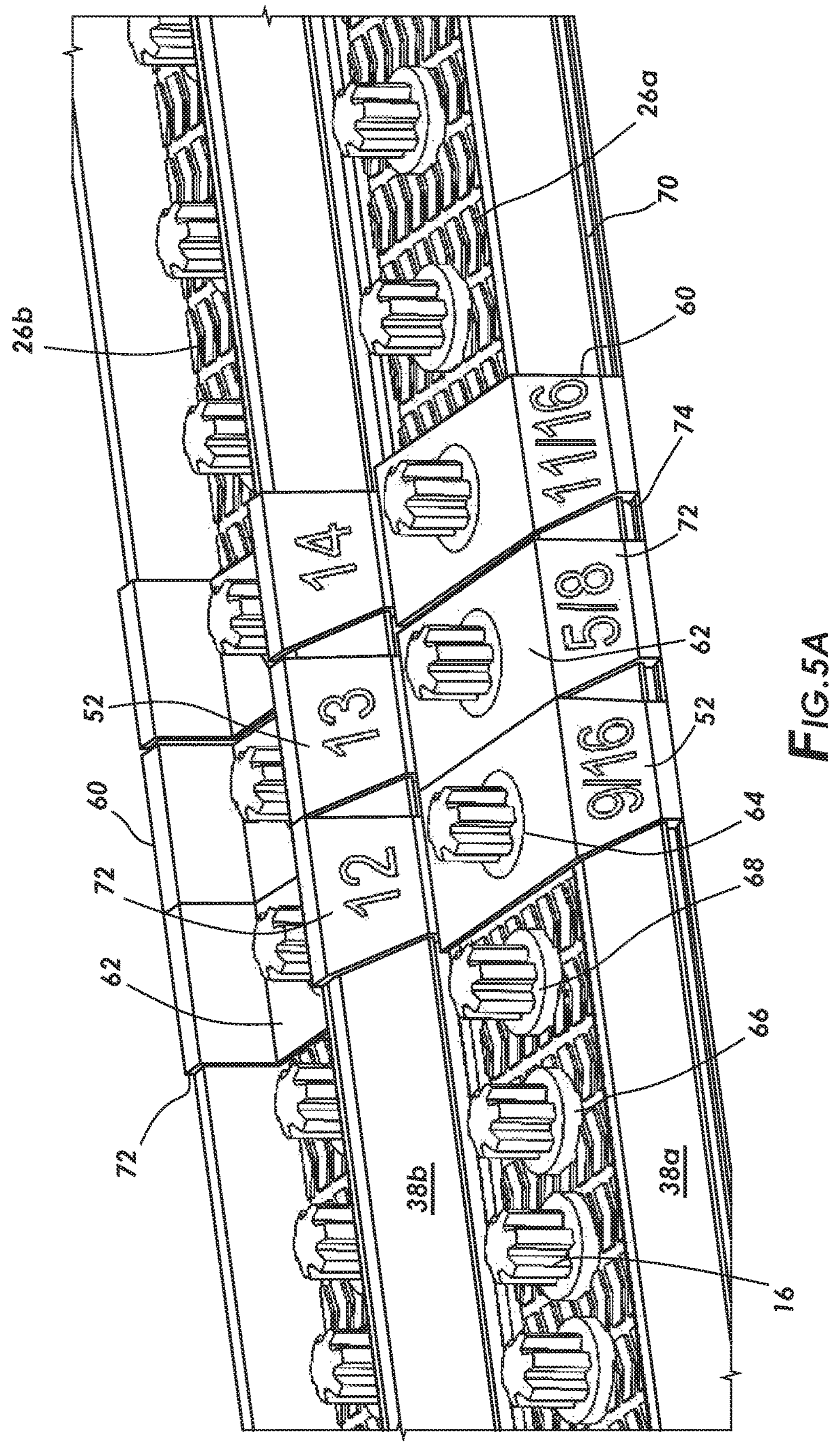
FIG. 5A is a partial orthogonal view of an exemplary embodiment according to aspects of the disclosure showing a socket holder and cooperating "clip" label assemblies.
Figure 5B:
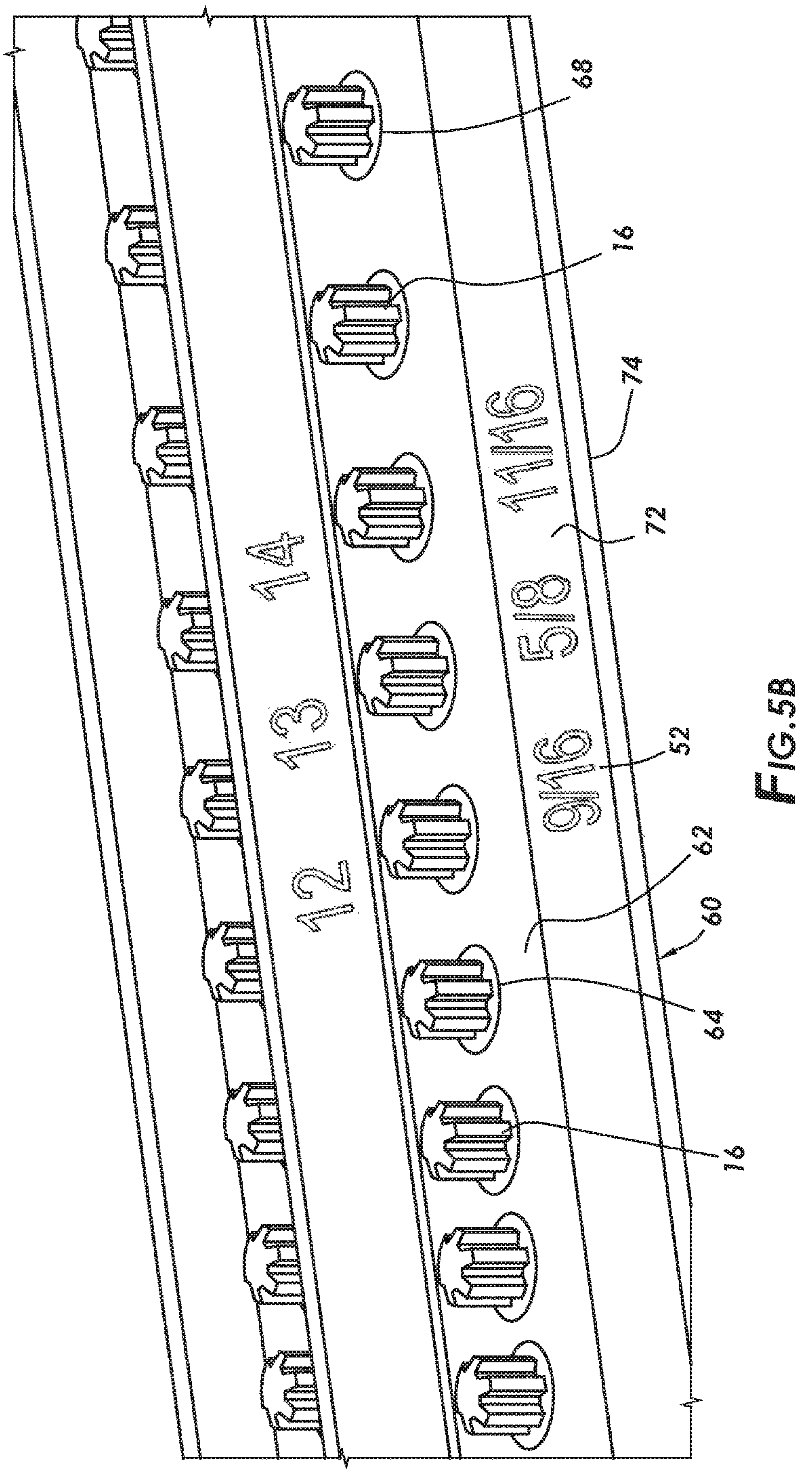
FIG. 5B is a partial orthogonal view of an exemplary embodiment according to aspects of the disclosure showing a socket holder and cooperating "clip" label assemblies.

FIG. 5A is a partial orthogonal view of an exemplary embodiment according to aspects of the disclosure showing a socket holder and cooperating "clip" label assemblies. FIG. 5B is a partial orthogonal view of an exemplary embodiment according to aspects of the disclosure showing a socket holder and cooperating "clip" label assemblies.

FIG. 5A is a partial orthogonal view of a holder assembly 10 having two parallel rows 14 each having a plurality of posts 16 for holding socket tools with a cooperating clip label assembly comprising a plurality of individual clip members 60. Exemplary clip members 60 cooperate with attachment mechanisms defined on the holder body 12.

In the embodiment shown in FIG. 5A, each clip member 60 comprises a generally horizontal central plate 62 having an aperture 64 extending therethrough. The aperture 64 cooperates with a coordinating post 16, allowing the post to extend through the aperture. In the embodiment shown, the post 16 includes a columnar shoulder 66 which fits closely through the aperture 64. A friction, snap-on, or other attaching fit can be provided between the columnar shoulder and the aperture. Various shapes of shoulder and aperture can be employed. In an embodiment, the shoulder upper surface 68 is flush with the central plate 62.

Each clip member 60 is removably attachable to the body 12. For example, the clip member 60 can slide on or snap on to the body at cooperating contours, indentations, apertures, etc., defined in the body 12. In the embodiment shown, each clip member 60 slidingly and grippingly engages grooves 70 defined in a wall 30, 32 or sloped surfaces 38 of the assembly body 12. As shown, the clip member 60 can have a central plate 62, opposing legs 72, and flanges 74. The central plate 62, in the illustrated embodiment, extends across a platform 26. The legs 72 can conform to the sloped surfaces 38, recess walls, or other surfaces of the body 12. The grooves 70 are grippingly engaged by the flanges 74 and the clip member is maintained on the holder assembly 10. In an embodiment, the legs 72 of the clip members are flexible and the clip member is "snapped" into an engaged position by pressing the clip member downward onto the assembly.

Alternately, the clip members 60 can be slidingly engaged onto and removed from the assembly body 12. In an exemplary embodiment, the body 12 defines a cross-section which cooperates with the clip member 60, allowing the clip member 60 to readily slide along the body 12 at grooves 70. An end cap (not shown) can be removably mounted to the assembly body 12, allowing clip members 60 to be slid onto the assembly body 12. In embodiments utilizing clip members 60 which are slidably attachable to the body 12, the posts 16 must be removable from the body, as explained elsewhere herein, such as by unscrewing from the holder or by also slidably attaching to the body.

In an embodiment, the clip members are constrained against rotational movement in relation to the assembly such as by interference between opposing legs of the clip member and a wall of the assembly.

The clip members 60 further include displayed markings 52 corresponding to the sockets held by the posts 16. The markings can be positioned on the clip central plate 62, leg 72, or other surface defined on the clip member 60. Alternately, a label plate can be used, similar to those described above herein with regard to FIGS. 4A-B.

The markings 52 provide socket identification information, for example, socket size in metric or standard units, and/or socket type, and/or indications for locking and unlocking the socket from the socket holder. The markings on any given clip member can be identical or different to other such markings.

Further, the clip members and body can comprise an orientation guide to insure clips are positioned in the correct orientation on the body. For example, as shown, the clip members 60 have a front leg 72 which is positioned at an angle corresponding to that of the sloped surface 38.

The clip members 60 seen in FIG. 5A are all of a uniform length and abut one another when positioned on the holder body 12. In some embodiments the posts 16 are spaced apart at varying distances to allow for mounting of varying size sockets on the holder. That is, some posts are spaced further apart than others. Similarly, the clip members 60 can be provided in varying lengths, with longer clip members corresponding to posts spaced further apart.

Figure 9:
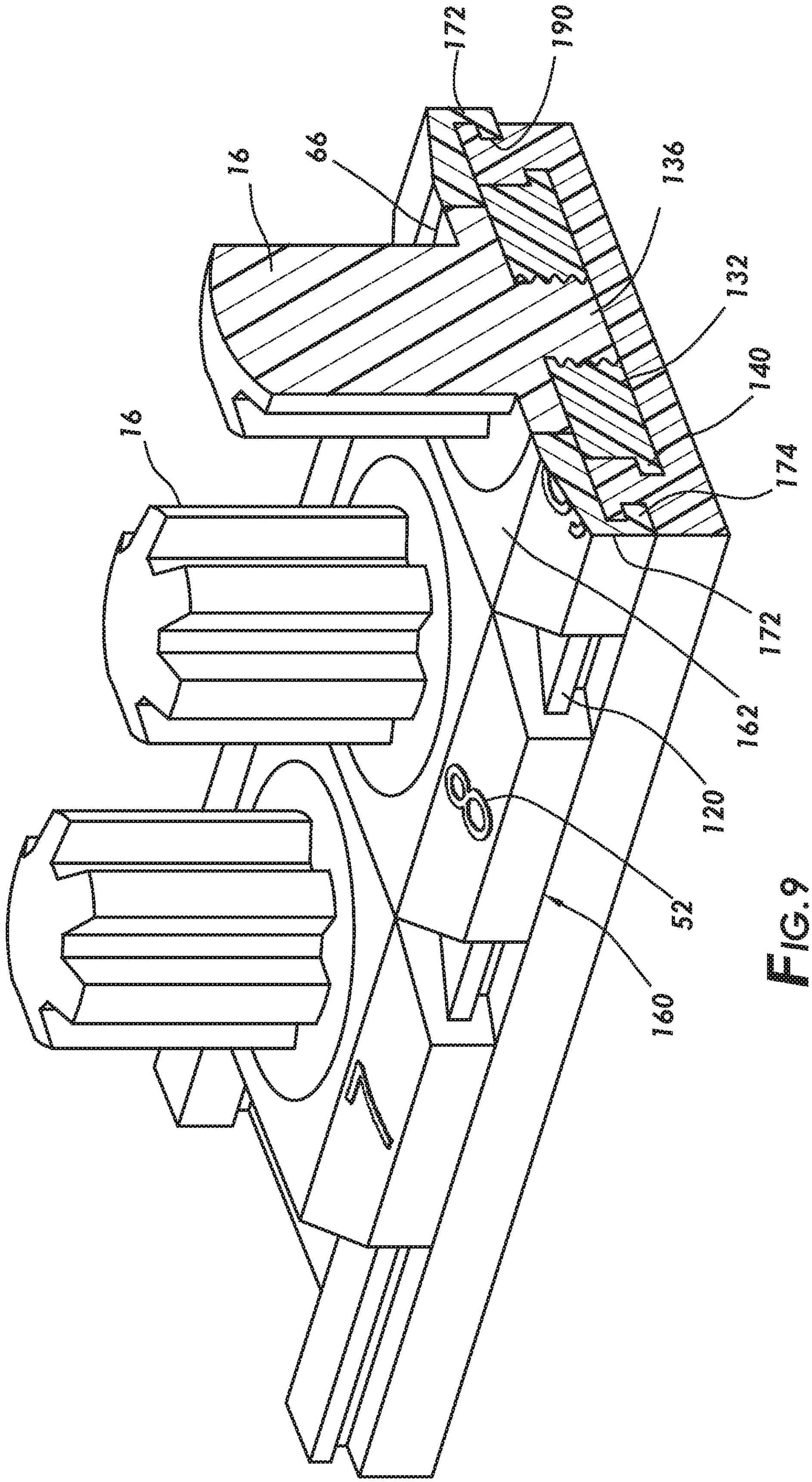
FIG. 9 is a detail cross-sectional view of the modular friction socket post assembly of FIG. 7 according to aspects of the disclosure.
Figure 11:
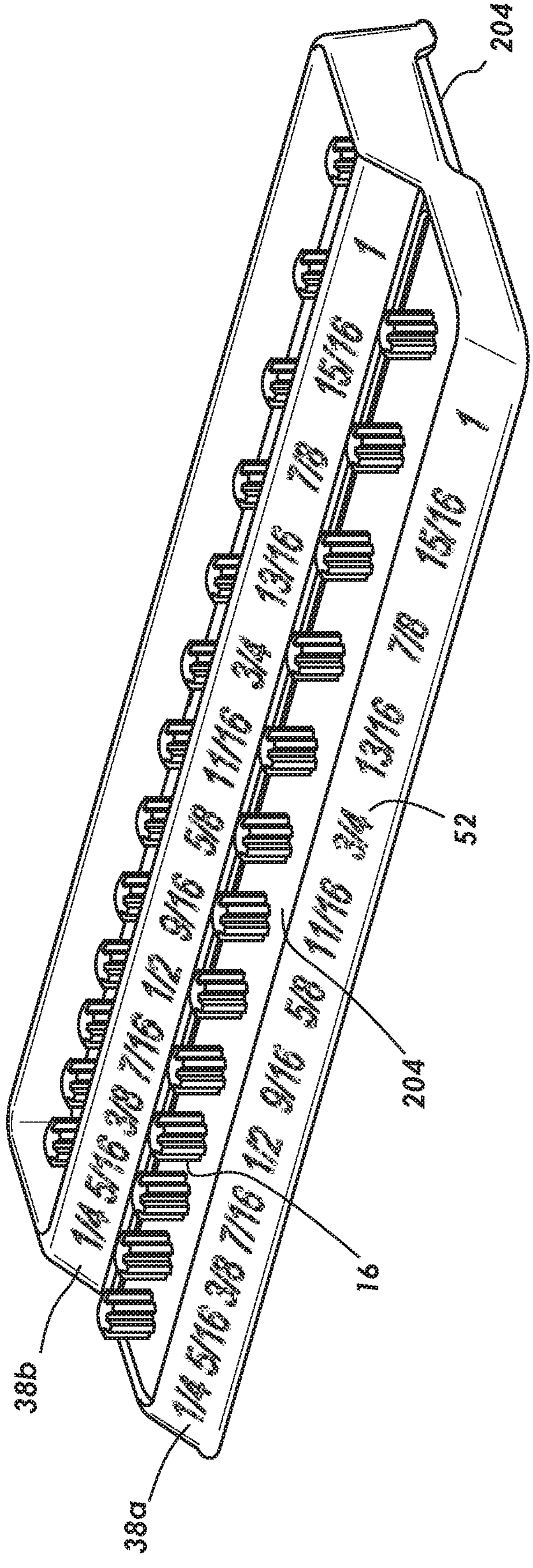
FIG. 11 is an orthogonal view of an embodiment of the friction post socket holder having a magnetic panel for attachment to a ferrous surface and a magnetic panel for securement of socket tools according to aspects of the disclosure.

Adjacent clip members 60 or adjacent socket holder assemblies 114 can, as seen in FIG. 9 and FIG. 11, abut one another defining a minimum spacing between adjacent, mounted sockets of the same or similar diameter. Socket sets typically have multiple sockets of small diameter and the clip members 60 each have a length of greater than the socket diameter to maintain spacing between adjacent mounted sockets. However, many socket sets include multiple sockets of relatively larger diameters due to the larger size of fastener for which the sockets are employed. Where larger diameter sockets are mounted on adjacent socket holder assemblies, the disclosure provides a mechanism to maintain sufficient spacing to prevent the larger sockets from knocking together during transport and reorientation of the rail assembly. As an example, a typical small socket base diameter is (approximately one-half inch, which size may be used for a number of sockets for differently sized fasteners. For such sockets, the clip members can have a length of approximately three-quarters inches. A larger diameter socket may have a diameter of one and one-half inches or greater. As an example, a two and one-half inch diameter socket can use a three inch long clip member. For such sockets, clip members are provided having lengths greater than the diameter of the designated socket.

In FIG. 5B a single lengthy clip member 60 is provided having a plurality of apertures defined therethrough corresponding to the plurality of posts 16. The lengthy clip member 60 has similar parts as described above such as a central plate 62, apertures 64, legs 72, etc. Attachment of the single lengthy clip member is similar to that described above with respect to the plurality of smaller clip members and will not be described here again. The lengthy clip member can have a plurality of markings 52 corresponding to the plurality of socket posts 16.

The user can be provided with a plurality of interchangeable clip members 60, fixedly or removably attachable to the body 12 at the user's selection. For example, a kit can be provided having a plurality of labels for SAE and metric measurements, socket type, drive socket type, socket head type, etc. The labels can be color-coded or otherwise visually differentiated.

Sockets and Posts

Socket wrenches, ratchets and other driving devices typically come with square drive heads which fittingly receive any of a corresponding set of sockets with similarly sized drive sockets. A socket typically has a socket head for receiving a fastener and a drive socket for receiving the drive post of the wrench, ratchet or other driving device. The socket head defines a fastener-shaped hole for receiving the head of a fastener. For example, a hex (hexagonal) head socket will drive a hex head fastener of the same size. The drive socket of the socket defines a hole for receiving the drive post of the drive device, such as a ratchet wrench. For square posted drive devices and drive sockets, standard sizes are typically one-quarter inch, three-eighths inch, and one-half inch square. (E.g., a "quarter inch drive socket".) Larger sizes are rarer but include standard sizes of three-quarter, one, and one and a half inches square.

For a set of sockets having a given size drive socket, multiple sockets are provided for various sized fasteners. For example, a quarter inch drive socket set might include thirteen sockets having a range of sizes and shapes for different fasteners. In FIG. 1, a holder assembly 10 is provided with a row 14*a* of posts 16 labelled and spaced for a set of thirteen SAE sockets having socket heads ranging in size from one-quarter inch to one inch. (For smaller sockets, the posts 16 can be spaced closer together obviously without adjacent sockets touching each other.) The row 14*b* provides thirteen posts labelled and spaced for use with thirteen metric size sockets ranging from size 7 to 19. The tool holder 10 can be provided in various lengths with various numbers of posts 16 and with various spacing between the posts 16 to provide for mounting of corresponding numbers of sockets. Further, additional rows 14 can be provided in alternate embodiments.

Additionally, socket wrenches and drive devices are available having a "spline drive." A spline drive uses a drive post with multiple splines (e.g., six) defined along the length of the drive post. The corresponding sockets obviously have splined drive socket holes for use with the splined drive post.

Typical sized sockets weigh between around 10 and 40 grams, although the weights depend on the socket material, the depth of the socket, the socket type, etc. For example, impact sockets are thicker walled and weigh more than standard sockets. Deep sockets are longer than standard "shallow" sockets and consequently weigh more. Some larger and smaller sockets are available and will weigh more or less.

Figure 6:
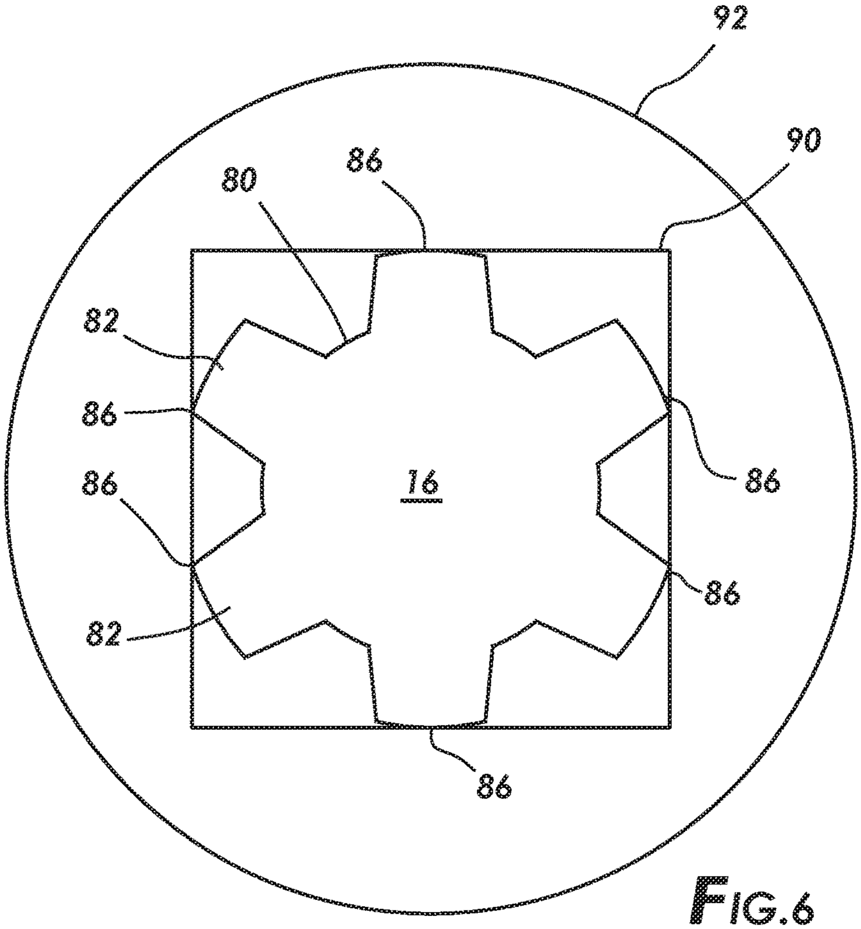
FIG. 6 is a cross-sectional view of a post having six splines with an overlay outline of the square drive socket of a socket tool showing six contact points between the socket and post.

FIG. 6 illustrates a cross-sectional view of a post 16 having six splines 82 with an overlay outline of the square drive hole wall 90 and socket exterior wall 92 of a socket tool showing six contact points 86 between the socket and post. Since the holder posts 16 hold the sockets by friction fit, the posts 16 are slightly larger in dimension than the corresponding drive socket hole. The posts 16 are made of a flexible material which elastically yield, flex or "give" when pressing the socket onto the post and which apply an outward force against the walls of the drive socket hole, thereby holding the socket onto the post.

The posts 16 can take various shape in cross-section. For example, the posts can be square, hexagonal, octagonal, round, etc. in cross-section. Square posts, however, may make it difficult to fit a square holed socket onto the post. The square socket hole would need to be rotationally aligned with the post, for example. The same is true for an octagonal post, for example. A cylindrical post would provide only four contact points with the walls of the square hole in the socket.

In one embodiment, the posts 16 have a central body 80 which is splined, as shown, having a plurality of longitudinal splines 82 running the height of the post 16. A splined post 16 can be especially useful for use with square drive sockets. In the embodiment shown, the post 16 has six splines 82, which can be said to roughly define a hexagon when the tips of the splines are connected by imaginary lines Similar posts having fewer or more splines can also be used. The post surfaces 84 between the splines can, for example, define a cylinder, hexagon, etc. The post surfaces between the splines do not contact the socket in use. One benefit of having six equally spaced splines 82 is that such a post provides for six points of contact 86 with the drive hole wall 90 of a square socket drive while not requiring rotational alignment between the socket and post.

A columnar post 16 (with circular cross-section), for example, would provide four points of contact 86 with a square socket drive hole wall 90. A square-column post 16 (with a square cross-section) would provide contact with the square drive hole wall 90 along its entire perimeter, but it would require rotational alignment of the socket and post. That is, the user would have to rotate the socket to the proper orientation to position the socket on the post. A four splined post would have the drawback of either requiring rotational alignment of socket and post or requiring spline diameters of greater size than the corner-to-corner dimension of a square drive hole. An eight splined post design results in unused splines (not contacting the socket), or requiring different dimensions from spline to spline, and rotational alignment.

In some embodiments the posts 16 are made of Thermal Plastic Rubber (TPR) or Thermal Plastic Elastomer (TPE). Alternate materials include silicone rubber. These materials provide resiliency and elasticity while also relatively easy for a user to force These materials are also resistant to chemical breakdown upon exposure to common but corrosive fluids such as brake cleaner and transmission fluids.

In some embodiments, the friction fit between a post 16 and positioned socket I such that the entire holder assembly 10 can be held upside down and the socket will not disengage from the post. The post is made of a material, as described, for providing a high friction between post and socket. Further, the post is sized and shaped to provide a solid friction fit between post and socket. Further, the post is made of (or covered in) a suitable elastic material to deform when the socket is positioned on the post and to then provide a positive elastic force against the socket. In some embodiments, a holding force of greater than 10 grams is provided by the fit between the friction post and the socket. In some embodiments, a holding force of greater than 10 grams is provided by the fit between the friction post and the socket. In some embodiments, a holding force of greater than 400 grams is provided by the fit between the friction post and the socket. In some embodiments, the friction fit force is great enough to allow the entire assembly, loaded with sockets, to be held by grasping only a single socket positioned on a post.

Overmolding

Overmolding is a manufacturing technique using consecutive moldings to create a monolithic item. For example, a single item is created by manufacturing a first part (a substrate) of a first material and then "molding over" the first part with a second material to create the unified single part. The substrate can be a machined metal part, a molded plastic part, etc. The substrate is partially or fully covered by the subsequently applied overmold materials which are injection molded into a mold tool formed around the substrate. When the overmold material cures or solidifies, the two materials become joined together as a single item. The resulting continuous item is composed of chemically bonded and often mechanically interlocked materials of different types. Overmolding materials can be plastic, rubber, Thermal Plastic Rubber (TPR) or Thermal Plastic Elastomer (TPE), for example.

In some embodiments, the friction post socket holder is manufactured using overmolding techniques. In FIG. 2, a bottom view of the friction post socket holder 10 shows signs and results of an overmolding process. The holder body 12 is made of a plastic material, and can be made by injection molding in some embodiments. The plastic material of the body 12 can be relatively hard and unyielding and therefore not suitable for a soft perimeter 22 for contacting a surface (e.g., a painted surface of a vehicle). Further, the plastic can be unyielding and non-elastic and so not suitable material for the friction posts 16. In the embodiment shown, the relatively softer perimeter 22, the posts 16 (or outer surfaces thereof), and platform sheets 28 are made of TPR, TPE or the like, and are overmolded onto the body 12.

Using the overmold technique, the holder 10 parts (first molded underlay and second molded overlay) are chemically and physically locked together. The perimeter is both chemically bonded to the body and mechanically interlocks with the body. For example, the perimeter 22 has interlocking tabs 94 which cooperate with notches defined in the body 12. Further, the platform sheets 28 and posts 16 are overmolded onto and into the body 12. The surface sheets 28 are chemically bonded to the underlying platforms 26 of the body. The sheets 28 are also mechanically interlocked with the body where, for example, overmold material columns 96 cooperate with corresponding apertures in the body 12.

In an embodiment, the posts 16 are entirely made of overmolded material. In another embodiment, the posts comprise a harder substrate covered by a softer overmold material. Overmolding insures that the perimeter 22, sheets 28 and posts 16 do not separate or detach from the body 12, either entirely or at random points between the overmold and substrate. The resulting holder 10 is of solid, unitary construction, and is tough and reliable.

Use of appropriate overmold materials provides a soft, gripping layer for contacting ferrous surfaces and chrome plated sockets which are prone to scratching. Further, the overmolding allows for a suitably flexible and resilient material to form or overlay the posts 16. Finally, the overmold process eliminates assembly parts such as fasteners, potentially reducing or eliminating fastener costs, scratching of sockets and surfaces by fasteners, machining time and costs for the holder body, and assembly time and costs for the holder generally. The overmolding also allows for colorful aesthetics (since the substrate and overmold can be of different colors).

Modular Post Assemblies

Figure 7:
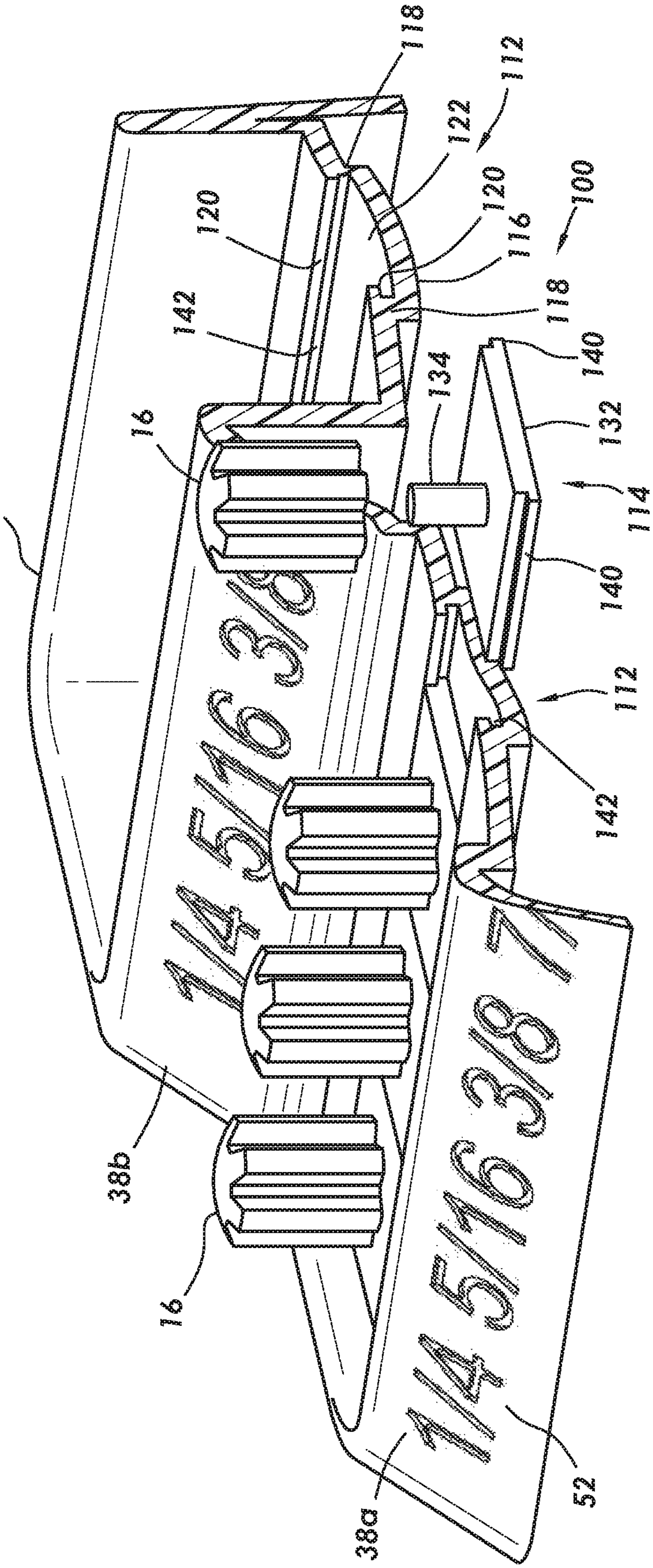
FIG. 7 is a cross-sectional orthogonal view of a modular friction socket holder post assembly having a plurality of removable post units according to aspects of the disclosure.
Figure 8:
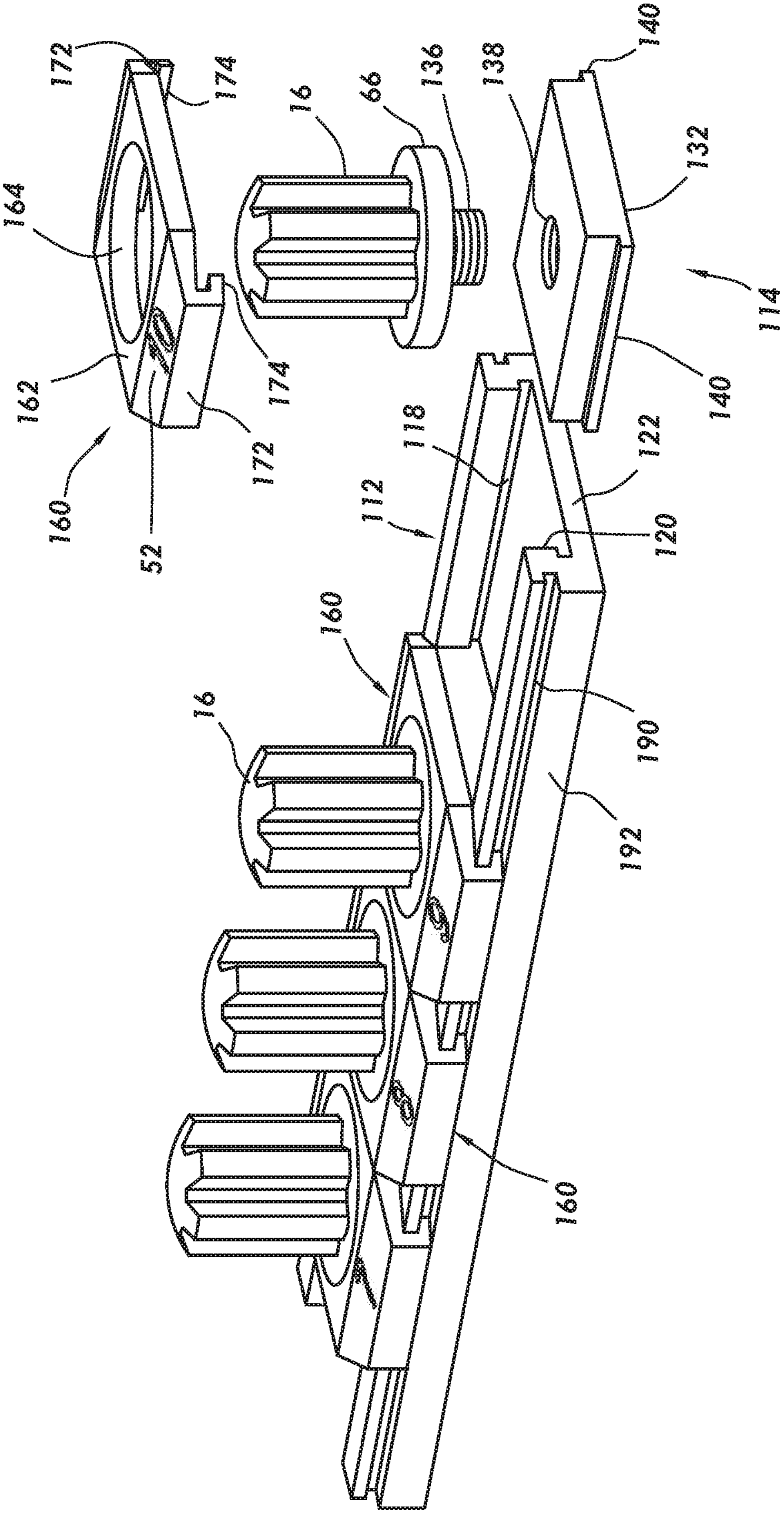
FIG. 8 is a partial orthogonal view of a modular friction socket post assembly according to aspects of the disclosure.

FIG. 7 is a cross-sectional orthogonal view of a modular friction socket holder post assembly having a plurality of removable post units according to aspects of the disclosure. FIG. 8 is a partial orthogonal view of a modular friction socket post assembly according to aspects of the disclosure. FIG. 9 is a detail cross-sectional view of the modular friction socket post assembly of FIG. 7 according to aspects of the disclosure. FIGS. 7-9 are generally discussed together to provide an understanding of the operation of the apparatus.

An apparatus 100 for releasably holding by friction fit posts 16 a plurality of socket tools includes a rail assembly 112 and plurality of socket holder assemblies 114 which slidably and removably engage the rail assembly 112.

The exemplary rail assembly 112 defines a generally U-shaped channel 122 having a bottom wall 116, opposing side walls 118, and opposing flanges 120.

Exemplary socket holder assemblies 114 slidably engage the rail assembly 112 as shown. The holder assembly 114 includes a post 16 and a base member 132. The base member 132 cooperates with the rail assembly 112.

FIG. 7 shows an exploded view of a socket holder assembly 114 having a base member 132 and a friction post 16 mountable to a tab 134 defined on the holder assembly base member 132. Alternately, the post can be defined on or formed monolithically with the base member 132. In FIG. 8, an embodiment is shown wherein the post 16 is mounted to the base member 132 by a threaded shaft 136 and cooperating threaded hole 138 in the base member 132.

Assembled socket holders are also seen in FIGS. 7-9, positioned on the rail assembly with the base member 132 engaging the channel 122 and the posts 16 extending upwardly out of the channel.

In an exemplary embodiment of a socket holder assembly 114, the base member 132 engages the channel 22. The base member 132 is of a size and cross-section to slidingly engage the rail assembly channel 122. Flanges 140 defined on the base member 132 cooperate with, slide within and maintain the holder assembly 114 in the channel 22. More particularly, the flanges 140 of the base member 132 slide into and engage the corresponding grooves 142 defined by the rail assembly walls 116, 118 and flanges 120. The bottom surface of the base member 132 may include friction (or anti-friction) features 133 to reduce (or increase) the force required to slide the socket holder assembly along the rail assembly. As seen in FIGS. 8-9, the rail assembly is shown removed from the tool organizer body and is attachable to the tool organizer body. Alternately, the rail assembly can be formed monolithically with the tool organizer body.

In the embodiment seen in FIG. 8, the assembly further includes a plurality of clip members 160. The socket holder assembly 114 defines a mounting post 16 and a columnar shoulder 66. A clip member 160 cooperates with the socket holder assembly 114 and rail assembly 112. In the embodiment shown in FIG. 8, the clip member 160 comprises a central plate 162 defining an upper surface and an aperture 164 defined therethrough for cooperating with the columnar shoulder 66 of the post 16. Socket markings 52 are provided on the clip. In an embodiment, the columnar shoulder upper surface 168 is flush with the upper surface of the central plate 162.

Each clip member 160 slidingly and grippingly engages grooves 190 defined in the exterior surfaces of the side walls 192 of the rail assembly body 14 in some embodiments. The clip member 160 has central plate 162, opposing legs 172, and flanges 174. The central plate 162, in the illustrated embodiment, rests on the base member 132 of the socket holder assembly 114. The grooves 190 are slidably engaged by the flanges 174 and the clip member is maintained on the rail assembly by engagement between the grooves 190 and flanges 174. In an embodiment, the legs of the clip members are flexible and the clip member is "snapped" into an engaged position by pressing the clip member downward onto the rail assembly. Alternately, the clip members can be slidingly engaged onto and removed from the rail assembly.

In an embodiment, the clip members are constrained against rotational movement in relation to the rail assembly. The clip member is constrained against rotational movement in relation to the rail assembly by interference between opposing legs of the clip member and at least a side wall of the rail assembly.

Adjacent clip members or adjacent socket holder assemblies can abut one another defining a minimum spacing between adjacent, mounted sockets of the same or similar diameter. As described elsewhere herein, sockets come in varying diameters. Consequently, in some embodiments, the socket holder assemblies 114 can be provided in varying lengths to accommodate the varying sizes of socket. Similarly, the clips can be a varying length.

In some embodiments, the rail assembly, socket holder assembly, and/or clip assembly can further includes orientation guides for proper orientation of these assemblies with one another. An orientation guide may require a base member 132, and therefore socket holder assembly 60, to be inserted into the interior channel 122 at a specified orientation. Thus, a set of socket holder assemblies would "face the same way" in the channel. For example, cooperating orientation mechanisms can be used on alternate assemblies. For example, one of the grooves 190 can employ an alternate profile which cooperates with a flange 140 of corresponding profile, thereby requiring orientation of the base member 132 in a specified orientation with respect to the rail assembly. Similar mechanisms can be used to orient the clips on the rail assembly.

Magnetic Plates

Figure 10:
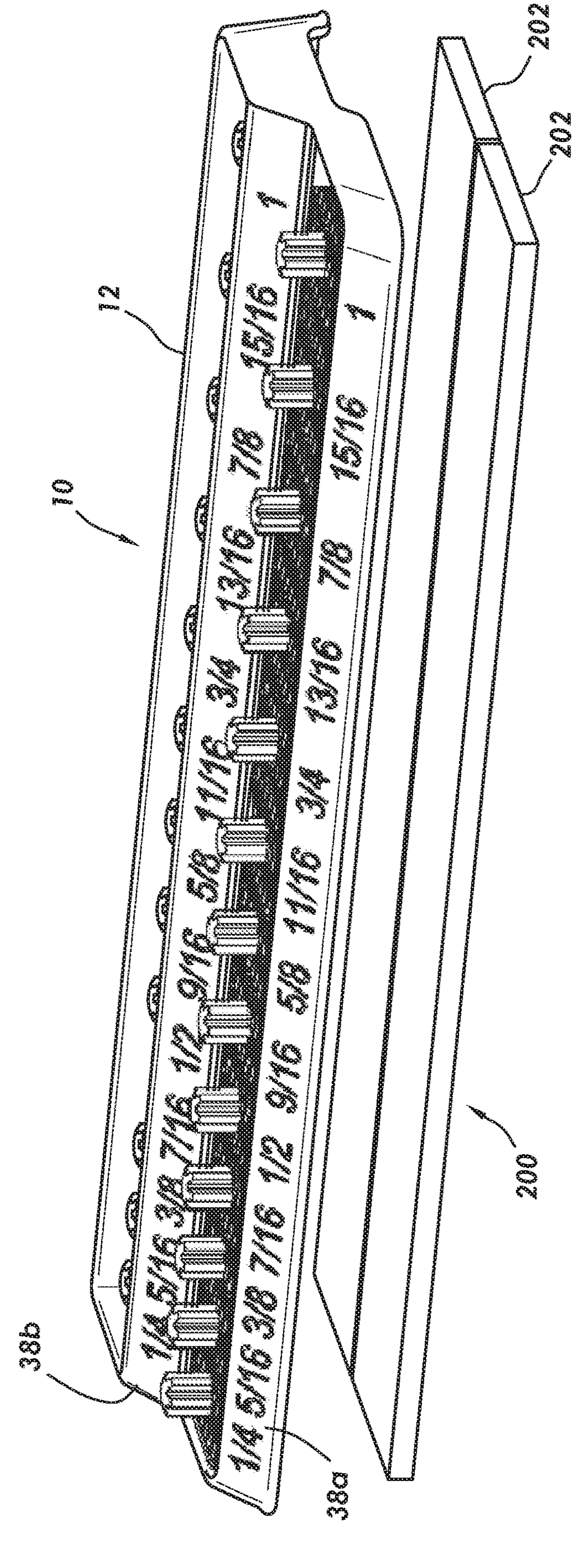
FIG. 10 is an orthogonal exploded view of an embodiment of the friction post socket holder having a magnetic panel for attachment to a ferrous surface according to aspects of the disclosure.

FIG. 10 is an orthogonal exploded view of an embodiment of the friction post socket holder having a magnetic panel for attachment to a ferrous surface according to aspects of the disclosure. FIG. 11 is an orthogonal view of an embodiment of the friction post socket holder having a magnetic panel for attachment to a ferrous surface and a magnetic panel for securement of socket tools according to aspects of the disclosure.

The magnetic back plate assembly 200 is attached to the assembly body 12, by friction fit, adhesive, fasteners, slide-in assembly (e.g., tongue and groove), a picture-frame assembly, or as otherwise known in the art. In the illustrated embodiment, the magnetic back plate 200 is mounted to the holder body 12. The magnetic back plate assembly 200 is, in the shown embodiment, comprises a plurality (two) of magnetic panels 202. The magnetic back plate assembly allows the holder assembly 10 to be securely positioned on any suitable ferrous surface.

In FIG. 11, additional magnetic tool mounting plates 204 are provided and positioned on the body 12 at or as the surfaces 28. Hence the sockets, when positioned on the holder assembly 10, are maintained in position by the friction fit of the posts 16 and the magnetic force of the plates 204.

While the making and using of various embodiments of the present disclosure are discussed in detail, it is appreciated that the present disclosure provides many applicable concepts that may be embodied in a wide variety of specific contexts. The specific embodiments discussed herein are merely illustrative of specific ways to make and use the disclosure. Only the claims appended hereto delimit the scope of any claimed inventions.

The invention claimed is:

1. A socket organizer for releasably holding a plurality of sockets, the organizer comprising:

a plurality of sockets, each socket having a square drive hole defined by four interior walls;

an organizer body having a plurality of posts extending upwardly therefrom, each of the plurality of posts for releasably holding a corresponding socket by friction fit with a force sufficient to maintain the socket tool on the post when the organizer is held upside down;

for each socket, the square drive hole of the socket releasably positionable onto a post regardless of the relative rotational positions of the socket and the post, and the socket maintained on the post by friction fit without rotating the socket relative to the post.

2. The socket organizer of claim 1, wherein the four interior walls of each socket are flat and without any shaped feature for cooperating with a respective one of the plurality of posts.

3. The socket organizer of claim 2, further comprising a plurality of socket holder assemblies releasably and movably attached to the organizer body, and wherein each of the plurality of posts is connected to a corresponding socket holder assembly.

4. The socket tool organizer of claim 1, wherein each post defines six splines extending along the post, points of contact occurring between the splines and the four interior walls of the drive hole.

5. The socket organizer of claim 1, further comprising a plurality of interchangeable labels removably attachable to the tool organizer body or the plurality of posts extending upwardly therefrom.

6. The socket organizer of claim 5, wherein each of the plurality of posts includes a columnar shoulder abutting an aperture defined in a corresponding label.

* * * * *